United States Patent Office 3,421,845
Patented Jan. 14, 1969

3,421,845
PRODUCTION OF SODIUM PHOSPHATES
John A. Peterson, Niagara Falls, N.Y., assignor to Hooker Chemical Corporation, Niagara Falls, N.Y., a corporation of New York
Filed June 7, 1965, Ser. No. 461,749
U.S. Cl. 23—107    14 Claims
Int. Cl. C01b 25/30

ABSTRACT OF THE DISCLOSURE

Crude phosphoric acid is treated with a reducing agent to convert metallic impurities contained in the acid to lower valence states. Crude sodium hydroxide is added at temperatures not in excess of about 100 degrees centigrade to produce a solid and a liquid phase which are separated, and pure disodium phosphates are recovered by crystallization from the liquid phase.

---

Figure 1:
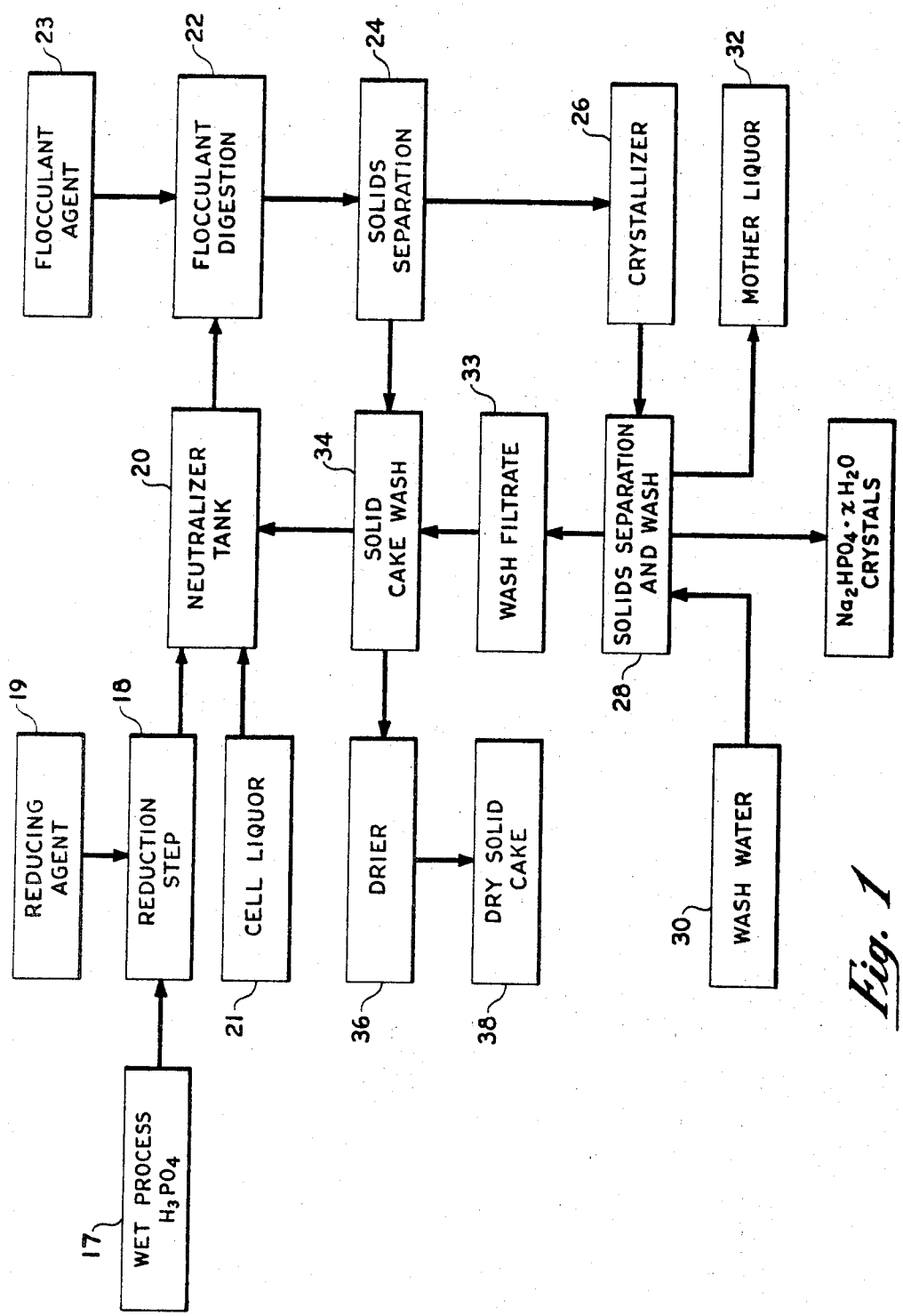

This invention relates to the manufacture of sodium phosphates and derivatives thereof. More particularly, this invention relates to a process for the production of sodium phosphates by direct reaction of crude phosphoric acid and crude sodium hydroxide.

Sodium phosphates, such as monosodium phosphate, disodium phosphate, sodium tripolyphosphate and the like are known compounds obtained by the reaction of phosphoric acid with sodium hydroxide or sodium carbonate. The methods of manufacture generally involve reactions with relatively pure reactants since the end products are normally desired free of impurities. The reaction of crude phosphoric acid with crude sodium hydroxide, such as cell liquor, results in an amorphous precipitate of solids which must be removed prior to isolating the sodium phosphate from the residual solution. The separation of the solid phase precipitate is often difficult and accomplished at rates less than desired in that the gelatinous solid phase settles slowly and is difficult to filter.

It is an object of this invention to provide a method for separating the insoluble impurities formed in the reaction of crude phosphoric acid and crude sodium hydroxide by converting the insoluble impurities to a more readily filterable precipitate. Another object of this invention is to provide a method for readily removing the water insoluble impurities including a major proportion of the metals, silicates, and fluorine impurities from the reaction mixture as a solid phase precipitate and to subsequently separate the product from the remaining water soluble impurities as a purified product. A further object of this invention is to lessen the time required for the process and to provide an overall integrated process for the production of disodium phosphate crystals. These and other objects will become apparent to those skilled in the art from the description of the invention.

In accordance with the invention, a process is provided for the production of sodium phosphate comprising treating crude phosphoric acid with a reducing agent to convert a metallic impurity in said acid to a lower valence state, reacting said treated crude phosphoric acid with crude sodium hydroxide to produce a solid material and a solution containing sodium phosphate and soluble impurities, separating the solid material from the solution and subsequently crystallizing sodium phosphate from the solution.

This invention is particularly directed to facilitating the settling and filtration rates of the solid material present at temperatures above about 40 degrees centigrade, so that filtration is effected at a rate several times that previously obtained. Thus, when removal of the solid phase formed on reacting crude phosphoric acid with crude sodium hydroxide by filtration without the use of a reducing agent would be at the rate of about one or two gallons per square foot per hour at 24 inches of mercury vacuum, the filtration rate using the method of this invention is increased to about 35 to 50 gallons per square foot per hour at 24 inches of mercury vacuum using the same filtering methods.

The present invention is particularly concerned with methods for improving the ease of separating the precipitated solid phase from the sodium phosphate values. As such, this invention provides means for pretreating the crude phosphoric acid with a reducing agent, means for adjusting the crude sodium hydroxide-crude phosphoric acid ratio to provide ease of filtration, treatment of the resulting slurry with a flocculating agent and controlling the crystallization step, depending upon the pretreatment steps applied to the crude phosphoric acid.

The term "crude phosphoric acid" means phosphoric acid obtained by the acidulation of phosphate rock, which acid is known as "wet process phosphoric acid." Such crude phosphoric acids usually have a $P_2O_5$ content of about 30 percent to about 70 percent. Such unrefined acids contain substantial quantities of impurities such as silica, fluorides, metal ions such as those of iron, aluminum, vanadium, manganese, and the like. Therefore, the acid used is a crude material which contains phosphate ions as $H_2PO_4{-}$, $HPO_4{=}$ and $PO_4{\equiv}$.

The term "crude sodium hydroxide" means sodium hydroxide containing substantial amounts of impurities and particularly cell liquor obtained from chlor-alkali diaphragm cells. Cell liquor is an aqueous solution derived from the catholyte compartment of chlor-alkali diaphragm cells. This liquor contains, in addition to water, about 9 to 15 percent sodium hydroxide, about 9 to 16 percent sodium chloride, 0.2 to 0.3 percent sulfate values, 0.1 to 0.2 percent chlorate values, with lesser amounts of silicon values, calcium values, magnesium values and carbonaceous materials and minor amounts of copper, nickel and iron. Thus, cell liquor is a relatively impure source of caustic soda which complicates the recovery of a purified sodium phosphate from such reactants.

Figure 2:
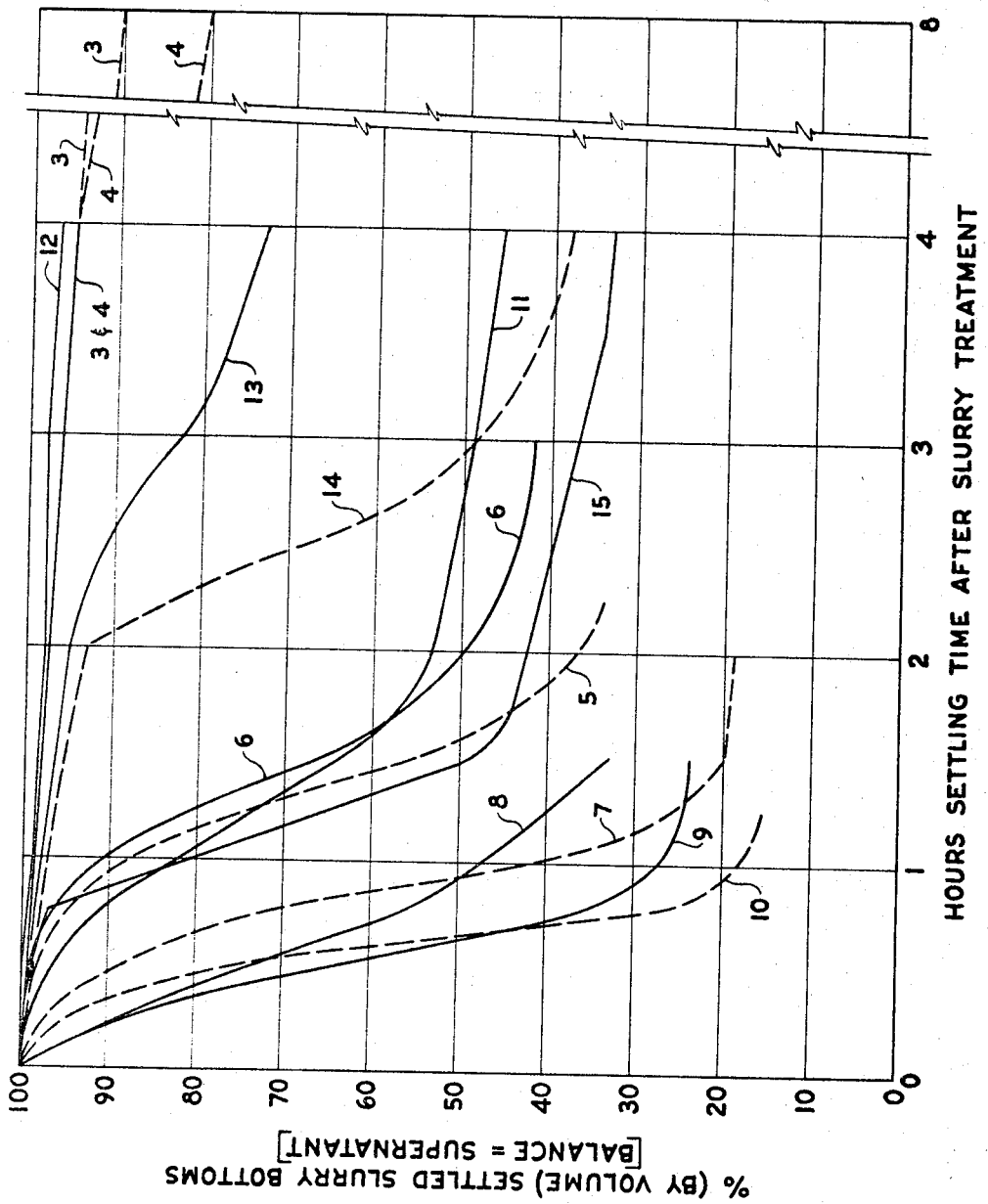

The process of this invention will be further described by reference to the drawings in which:

FIG. 1 is a flow sheet illustrating the process of the present invention, and wherein FIG. 2 is a graph illustrating the improved settling rates and filtration rates obtained by the process of this invention.

As illustrated in FIG. 1, the recovery of pure sodium phosphates from crude phosphoric acid and crude sodium hydroxide involves several steps. First, crude phosphoric acid and crude sodium hydroxide are mixed to form a slurry. The resulting liquid phase, at temperatures above about 40 degrees centigrade, contains most of the sodium ions, phosphate ions, sulfate ions, chloride ions and other water soluble impurities. The solid phase is an amorphous precipitate of complex metal phosphates and other water insoluble impurities. The solid phase also contains precipitated fluoride compounds such as fluosilicates or cryolites, and the like, when fluoride containing compounds are present in the starting material. The precipitate also contains a major proportion of the iron, aluminum, vanadium, magnesium, chromium, calcium, manganese and the like metals present in the starting acid and cell liquor. The removal of the precipitated solids at elevated temperatures provides a separation of the phosphate values from most of the metal silica, alkaline earth and fluoride contaminants present.

The liquid phase obtained on removal of the solid phase is cooled and/or concentrated to bring about crystallization of hydrates of disodium phosphate. Disodium phosphate heptahydrate ($Na_2PO_4 \cdot 7H_2O$) is recovered at temperatures above 20 to 25 degrees centigrade and disodium phosphate dodecahydrate ($Na_2PO_4 \cdot 12H_2O$) is obtained if the crystallization temperature is less than about 20 degrees centigrade. In many instances, it is preferred to recover the sodium phosphate in two steps, first removing the heptahydrate and then the dodecahydrate. When the crystals are removed as disodium dodecahydrate, the highest phosphate recovery is obtained in that lower temperatures are used.

The crystallization, separation of the crystals from the mother liquor and subsequent washing of the crystals provides a separation of the phosphate values from the remaining metal impurities, sodium chloride, sodium sulfate and other water soluble impurities found in the crystallizing solution.

Having obtained the sodium phosphate product as separated crystals, the product is used or sold as such, or converted to other phosphates or polyphosphates by known processes. By calcining the disodium phosphate obtained, sodium pyrophosphate is produced. When one mole of phosphoric acid is reacted with five moles of disodium phosphate and the resultant material subjected to calcination, sodium tripolyphosphate is obtained. By the addition of one mole of phosphoric acid per mole of disodium phosphate and reacting and calcining the mixture, sodium metaphosphate is produced. In these further reactions, it is preferred that the phosphoric acid used be a relatively pure acid so that further purification of the derivatives of the disodium phosphate is avoided.

Referring to FIG. 1, wet process phosphoric acid 17 is passed to reduction step 18, wherein reducing agent 19 is added to the acid to convert the metallic impurities to lower valence states. An effective amount of reducing agent changes the oxidation potential of the acid solution. Typically, the potential of untreated starting acid may be +250 millivolts compared to +150 millivolts for the treated acid.

Many reducing agents will provide a conversion of the metallic impurities in the acid solution from an oxidized to a reduced valence state. In such a reduction, ferric (III) is reduced to ferrous (II), vanadium (V) is reduced to vanadium (IV), and so on. Evidence of reduction is the formation of a dark brown or green precipitate on neutralizing the acid with cell liquor as opposed to a light tan colored precipitate from acids not treated with a reducing agent. The critical test for proper reduction is the development of rapid settling and filtration properties of the precipitate in the subsequent separation steps.

The preferred reducing agents are metallic iron and sodium dithionite ($Na_2S_2O_4$) and the most preferred is metallic iron used in an amount equal to 0.01 to 0.8 percent by weight and more preferably, 0.05 to 0.3 percent by weight of the total acid solution treated. Other reducing agents such as sulfites, nitrites, phosphites, sulfites, sulfides, hydrazine and the like can also be used in amounts of about 0.5 to 3 percent by weight of the total acid solution.

For reducing agents other than metallic iron, the agent is preferably added to the acid while agitating and maintaining the acid at a temperature of 25 to 100 degrees centigrade. When metallic iron is used as the reducing agent, the acid temperature is preferably held in the upper temperature range of about 70 to 100 degrees centigrade to accelerate the dissolution of the iron in the acid. It is also preferred to thoroughly mix or otherwise intimately contact the solid metallic iron with the acid. For example, iron turnings can be added to a vigorously stirred acid solution or the acid can be passed through a column packed with iron turnings, finely divided iron, etc.

In addition to increasing the filtration and settling rates of the precipitated solids, the treatment with a reducing agent may lead to an increase in the amount of metallic impurities contained in the precipitate and a sodium phosphate filtrate which contains lesser amounts of impurities. The lower metallic impurity concentrations in the filtrate, particularly the lesser amounts of vanadium, allow utilization of somewhat higher sodium phosphate concentrations in the crystallization solution. The higher sodium phosphate concentrations make possible a higher yield of purified phosphate crystals at a given temperature. Thus, when disodium phosphate dodecahydrate crystals are crystallized and recovered at 5 degrees centigrade, a crystallizing solution made from acid not treated with reducing agent should contain not more than about 15 to 16 percent of disodium phosphate and about 13 to 14 percent of sodium chloride. When the acid is treated with a reducing agent, the crystallizing solution may contain 16 to 18 percent of disodium phosphate and proportionately more salt without encountering difficult impurity contamination. Phosphate recovery in the crystals is also some 2 to 4 percent more than in the former case. Without the use of a reducing agent, concentrated crystallization solutions tend to form crystals of increased metallic impurities that are not readily removed by washing. It is believed that some of the impurities present, particularly vanadium, become incorporated into the disodium phosphate crystal lattice.

The reduced phosphoric acid solution of reduction step 18 is subsequently passed to neutralizer tank 20 wherein cell liquor 21 is mixed with the acid. Sufficient cell liquor is added to form a slurry having a pH above 8.0 and preferably above about 8.5. Most effective use of the cell liquor is obtained by neutralizing to a pH not exceeding about pH 9.5 and preferably to a pH in the range of pH 8.5 to pH 9.0. For most preferred results, it has been found that the pH to which the solution is neutralized has a pronounced effect upon the settling and filtration properties of the resultant slurry. It has been found that subsequent additions to a slurry below a pH of 8.5 of other reagents which tend to increase the pH to the preferred range of pH 8.5 to pH 9.0 do not as favorably improve the filtration rate as when the desired pH is obtained directly by cell liquor addition. Thus, the improvement of settling and filtration properties resembles an end point change such as that found in acid-base titrations. There is a sharp response to pH conditions rather than a gradual improvement in properties as the pH is increased in the range of pH 8 to pH 9.5. While increase of pH to, or above, the top of preferred range, i.e., pH 9.5 will not impair filtering or settling properties, it is most preferred to maintain no higher than pH 9.0 as it is desired to keep Na/P molar ratio as near as possible to 2.

The acid and cell liquor are combined in a ratio which provides a Na/P mole ratio of 1.9 to 2.2 and preferably a mole ratio of 2.00 to 2.15, thereby obtaining a slurry in the proper pH range. The proportion of reactants can be readily calculated for the particular cell liquor and crude phosphoric acid by using 2 moles of NaOH per mole of any $H_2SO_4$ impurity in the crude phosphoric plus 2.0 to 2.1 moles of NaOH per each mole of $H_3PO_4$.

The neutralization step is an exothermic reaction. It is preferred to maintain or increase the reaction temperature to above about 40 degrees centigrade and preferably to between 50 and 100 degrees centigrade.

The slurry obtained in neutralizer tank 20 is passed to flocculent digestion zone 22 wherein flocculent agent 23 is added and mixed with the slurry and the resulting slurry aged. Conventional aqueous flocculent agents can be used in this step. However, the prefered flocculent agent is an alkaline calcium compound. Most preferred is calcium oxide (CaO) added in an amount of about 0.05 to about 1.0 percent by weight of the slurry and more preferably in an amount of about 0.2 to about 0.3 percent by weight of the slurry. The addition of calcium oxide causes only a small rise in the slurry pH. The effect of addition of CaO as flocculating agent is to expedite the settling of the solids present to a low volume of thickened pulp and to increase the rate of filtration of these solids. While settling properties may be nearly equally good without CaO addition if preferred pH range conditions are maintained, the addition of CaO will cause up to a 10-fold increase in the filtration rate, compared to when the flocculating agent is not used.

Although the amount of calcium oxide added to the slurry is calculated as CaO content, aqueous slurries of calcium oxide, calcium hydroxide, lime, milk of lime and the like can be used. A 10 percent calcium hydroxide slurry has been found to be a convenient method of adding the desired amount of calcium oxide to the reaction mixture. It is preferred to add such calcium hydroxide slurry to the reaction mixture slurry in such manner as to cause an even and rapid distribution of the lime throughout the mixture.

After addition of the flocculating agent 23, the slurry is held for aging and solids settling in flocculent digestion stage 22 with or without slow agitation at a temperature beween about 50 to 100 degrees centigrade for a period of time sufficient to initiate the coagulating effect of the flocculating agent on the amorphous precipitate. Preferably, this induction period is of about 5 minutes to about 6 hours. Use of most preferred conditions in previous steps will result in the shorter time.

From flocculent digestion stage 22, the slurry is passed to solids separation stage 24 wherein the solids are removed from the slurry by conventional liquid-solid separation techniques. Such techniques include centrifuging, filtration, vacuum filtration, decanting and the like. When filtration techniques are used, it is often preferred to add a filter aid such as a diatomaceous earth, silica, clay or the like filter aid material. The liquid-solid separation is conducted at a temperature at which the sodium phosphate values remain in solution at above 40 degrees centigrade and preferably between about 50 and 100 degrees centigrade.

The filtrate separated in the solids separation zone 24 is passed to crystallizer zone 26 wherein the crystallization of sodium phosphate is effected by reducing the temperature of the filtrate solution, further concentrating the filrate by evaporation of water or a combination of crystallization techniques. Either batch crystallization or continuous crystallization techniques can be employed. When using continuous crystallization techniques, the particular temperature used depends on whether the heptahydrate or the dodecahydrate of disodium phosphate is desired. Continuous crystallization techniques involve the continuous feeding of the filtrate from solids separation zone 24 to a continuous low temperature crystallizer or a two step process wherein heptahydrate crystals are removed above about 20 to 25 degrees centigrade and dodecahydrate crystals are removed below about 20 degrees centigrade. Best results are obtained by crystallizing the filtrate at temperatures below about 50 degrees centigrade and above the temperature at which water crystals begin to form, i.e., about 0 degrees centigrade. The exact temperature used depends on the crystalline phase desired and upon the concentrations of $Na_2HPO_4$ and NaCl in the solution. The crystallization solution is maintained below saturation with respect to NaCl during phosphate crystallization.

The crystals are separated from the filtrate in solids separation and wash step 28. Cold wash water 30 is used to remove adhering mother liquor and soluble salts such as NaCl and $Na_2SO_4$ from the separated crystals. The washed crystals are subsequently removed from the solids separation and wash step 28. Mother liquor 32, is also separated from the crystals. Depending upon the particular crystallization temperature used, the mother liquor will contain from about 0.5 percent to about 10 percent disodium phosphate, the lesser amount at the lower crystallization temperature, in addition to appreciable amounts of sodium chloride, sodium sulfate, water soluble metals and other impurities. At the higher temperatures, such as those used in the crystallization of disodium heptahydrate, sufficient sodium phosphate may be present in the mother liquor to warrant the recycling of this liquor for further crystallization. Such recycle processes may include a sodium chloride removal step prior to further crystallization of sodium phosphate.

The wash water passed through solids separation and wash step 28 is conveniently used to wash the solid cake 34 removed in solids separation step 24, prior to returning the wash filtrate 33 to neutralizer tank 16.

The solid cake washed in solid cake wash zone 34 is passed to drier 36 wherein it is dried and granulated to obtain a dry solid cake 38 which is suitable for use as a fertilizer.

The following examples illustrate certain preferred embodiments of the present invention. Unless otherwise indicated, all parts and percentages used herein are by weight and all temperatures are in degrees centigrade.

EXAMPLE 1

The process of the present invention was carried out in accordance with FIG. 1 of the drawing by reducing 1,000 parts of wet process phosphoric acid containing 54 percent $P_2O_5$ with 1.5 parts of metallic iron. The reduction was effected by dissolving metallic iron in the wet acid at a temperature of 85 to 95 degrees centigrade. The reduced acid, in an amount of 1,000 parts was then mixed with 5,690 parts of cell liquor comprised of about 882 parts of sodium chloride, about 648 parts of sodium hydroxide, minor amounts of various impurities with the remainder being substantially water. The cell liquor corresponded to about 11.4 percent sodium hydroxide and about 15.5 percent sodium chloride. The reactants were mixed at a temperature of about 90 degrees centigrade thereby resulting in a pH of 8.6. During the neutralization, the reaction temperature was increased to about 100 degrees centigrade and 1,240 parts of water were evaporated from the mixture thereby further concentrating the reactants. During this neutralization reacion, an amorphous precipitate was formed. In addition to the crude phosphoric acid and cell liquor reactants mixed in the neutralization step, wash water from the crystallization step and neutral cake washing step was fed to the reaction mixture.

A flocculating agent, calcium oxide, was then added to the neutralized slurry as a 10 percent solution of calcium hydroxide, thus resulting in the addition of 15.5 parts of calcium oxide. The resulting slurry totaled 6,630 parts. This slurry was maintained under slow agitation at a temperature of 65 to 75 degrees centigrade for 1½ to 2 hours. At the end of the digestion period, 0.5 percent of a silica filter aid by weight of the slurry was mixed into the slurry. The resulting slurry was then filtered at 65 degrees centigrade. The filtration resulted in the removal of the solid phase which amounted to 467 parts. 6,160 parts of filtrate were recovered. Analysis of the neutral cake indicated that it contained 59 parts of $P_2O_5$, the remaining parts being primarily metal impurities and water.

The filtrate was an aqueous solution comprised of about 16 percent sodium phosphate, 15.2 percent sodium chloride, 1.22 percent sodium sulfate in addition to various other metal impurities.

The sodium phosphate in the filtrate was then crystallized by reducing the temperature of the filtrate to 5 degrees centigrade. During temperature reduction, crystals were observed to be forming in the filtrate solution. The crystals were separated from the mother liquor by filtering at 5 degrees centigrade. The crude crystals removed from the mother liquor were in an amount of 2,630 parts. Analysis indicated that the crude crystals were composed of 926 parts of disodium phosphate, 74 parts of sodium chloride, 24.9 parts of sodium sulfate, water of hydration, free water and metallic impurities. Analysis of the recovered mother liquor, which was recovered in an amount of 3,530 parts, indicated that it was comprised of 29.5 parts of $P_2O_5$, 59 parts of disodium phosphate, 866 parts of sodium chloride, 49.3 parts of sodium sulfate and 2,560 parts of water.

The crude crystals were then washed with cold water (5 degrees centigrade) to remove the adhering mother liquor, sodium chloride and sodium sulfate. The recovered washed crystals amount to 2,560 parts of disodium phosphate dodecahydrate having less than 0.1 percent sodium chloride and about 1.4 percent sodium sulfate. The crystals were pure white in color.

A comparative analysis of the iron, aluminum, vanadium, manganese, chromium, fluoride and calcium ions present in the wet acid and the washed disodium phosphate dodecahydrate crystals is shown in Table I.

TABLE I

| | Concentration in wet acid—parts per million or percent | Concentration in washed crystals—parts per million |
|---|---|---|
| Fe | 1.0 | 4 |
| $Al_2O_3$ | 1.0 | 40 |
| V | 90-140 | <5 |
| Mn | 190-220 | <2 |
| Cr | 70 | <7 |
| F | 0.3 | <10 |
| Ca | 90 | <2 |

It is to be observed that the crystals obtained by the present method are of a very high purity having only trace amounts of the ions which were present in the starting material.

The mother liquor recovered after removal of the disodium phosphate crystals is further treated to remove the phosphate and sulfate ions by the addition of a stoichiometric amount of calcium oxide. Having removed the phosphate and sulfate ions, the resulting liquor is recycled to chlor-alkali cells wherein the sodium chloride is further utilized. The precipitated phosphate and sulfate ions, obtained as the calcium salts, are useful as feed supplements.

The solid phase separated in the present process contains phosphate values as well as trace elements needed in balanced agricultural fertilizers. Therefore, the removed solid phase is suitably converted to a fertilizer or fertilizer additive by heating to an elevated temperature above about 100 degrees centigrade to remove the water thereby producing a dried fertilizer material.

EXAMPLE 2

The disodium phosphate dodecahydrate recovered in Example 1 was converted to sodium tripolyphosphate by reacting 2,560 parts of disodium phosphate dodecahydrate crystals with 147 parts of pure 85 percent phosphoric acid. The reactants were mixed and heated to a temperature of 350 degrees centigrade for about 1 hour. The resulting calcination produced 936 parts of sodium tripolyphosphate. The tripolyphosphate product was pure white in color and analysis indicated that it contained 10 parts per million of Fe, 50 parts per million of Al, less than 15 parts per million of vanadium, less than 5 parts per million of manganese, less than 20 parts per million of chromium, less than 25 parts per million of fluorine and less than 5 parts per million of calcium. These crystals were of acceptable commercial purity.

EXAMPLES 3–15

The following examples illustrate the pronounced increase in settling the filtration rates obtained by the processes of this invention. Reference is made to FIG. 2 which graphically illustrates the settling times obtained in Examples 3–15. It has been found that the settling rate and the filtration rate of these slurries are related in a manner such that rapid filtrations were always preceded by a rapid settling rate.

The basic procedure of Example 1 was used in effecting the reaction in all of the examples. Analysis of the crude phosphoric acid used, a wet process acid, indicated that it contained 69.70 percent $PO_4\equiv$ ion concentration which was equivalent to a 52.1 percent $P_2O_5$ concentration, a sulfate ion concentration of 7.05 percent, an iron concentration of 1.26 percent, a vanadium concentration of 140 parts per million, a manganese concentration of 220 parts per million, a chromium concentration of 72 parts per million, a calcium concentration of 93 parts per million and a fluorine concentration of 0.21 percent. The cell liquor used contained 15.46 percent sodium chloride, 11.44 percent sodium hydroxide and minor amounts of organic and inorganic impurities.

After reacting the wet acid and cell liquor in the manner of Example 1, samples of the reaction mixture were placed in graduated cylinders and held at 65 degrees centigrade. The settling rate of the solid phase was observed during this holding period and is graphically shown in FIG. 2. Table II indicates the variables used in Examples 3 through 15. The example numbers correspond to the curve numbers shown in FIG. 2.

"Overall filtration rate" in Table II, represents the time required for filtration of about equal quantities of slurries on the same filter (a büchner funnel) at a constant applied vacuum. While an empirical value, it allows intercomparison of filtration properties of the slurries under constant conditions.

TABLE II

| Example and curve number (Fig. 2) | Pretreatment of acid: reducing agent Added, percent Fe | Added to slurry Percent CaO slurry basis | Added to slurry Other | pH Initial slurry | pH Treated slurry after CaO, etc. | Filtrate | Filtration of slurry Age when filtered (hours) | Filtration of slurry Overall rate parts slurry per minute |
|---|---|---|---|---|---|---|---|---|
| 3 | None | 0 | 0 | | | 8.5 | | Slow |
| 4 | None | 0.25 | 0 | | | 8.7 | | Slow |
| 5 | 0.16 | 0.25 | 0 | 8.55 | | 8.80 | 2.5 | 300 |
| 6 | 0.22 | 0.1 | 0 | 8.45 | 8.55 | 8.90 | 1.75 | 58 |
| 7 | 0.22 | 0.25 | 0 | 8.80 | 8.90 | 9.02 | 1.3 | 385 |
| 8 | 0.24 | 0 | 0 | 8.80 | | 8.85 | 1.0 | 45 |
| 9 | 0.24 | 0.25 | 0 | 8.80 | 8.95 | | 1.0 | 185 |
| 10 | 0.24 | 0.25 | 0 | 8.70 | 8.85 | 9.00 | 1.0 | 185 |
| 11 | 0.22 | 0 | | 9.00 | | 0.1 | 2.0 | 13.5 |
| 12 | 0.24 | 0 | 0 | 8.15 | | | No test | |
| 13 | 0.24 | 0.5 | 0 | 8.15 | Not tested | 8.80 | No test | |
| 14 | 0.24 | 0 | (¹) | 8.15 | 9.35 | 9.35 | No test | |
| 15 | 0.24 | 0.25 | (¹) | 8.15 | (²) | 9.5 | No test | |

¹ Extra cell liquor added.  ² 9.35 after cell liquor addition; 9.5 after CaO addition.

A comparison of the curves of FIG. 2 with the various examples indicates the pronounced increased settling rates and correspondingly improved filtration rates by treating the reactant mixture as indicated. Curve 3, corresponding to Example 3, illustrates the typical slow settling and difficult filtration obtained in reacting untreated crude phosphoric acid with cell liquor. Curve 4, corresponding to Example 4, shows a slight improvement after an extended digestive period wherein a flocculating agent (lime) was used.

Curve 12, corresponding to Example 12, when compared to curve 13 corresponding to Example 13, illustrates the synergistic effect of using both a reducing agent and a flocculating agent. It will be noted that the solutions of both Example 12 and Example 13 were neutralized to the same pH, but that this pH was below the preferred range of pH 8.5–9.0. When crude acid reduced in the preferred manner was neutralized at the more preferred pH range of 8.5–9.0 followed by treatment with the preferred lime flocculating agent, very rapid settling and filtration were observed, as is seen in Examples 7, 9 and 10, and corresponding curves.

In Examples 8 and 11, preferred reducing agent and pH conditions were used, but flocculating agent was not added. Settling rates approached the good results of Examples 7, 9 and 10 as seen in curves 8 and 11 but filtration rates, shown in Table II, were far inferior for Examples 8 and 11 as compared to Examples 7, 9 and 10 where a flocculating agent was used.

Formation of slurry at a pH below the most preferred pH 8.5 to 9.0 range, i.e., at pH 8.15, followed by adjustment to the upper level of the broad preferred range (to pH 9.35) is illustrated in Examples 14 and 15 and the corresponding curves. It is seen that settling rate is much slower in these cases as compared to experiments where slurry was formed in the preferred range of pH 8.5 to 9.0. Best comparisons are Example 14 with Example 8, where no flocculating agent is used, the difference being the pH of the neutralized slurry, and Example 15 with Example 7, where a lime flocculating agent was used with slurries neutralized to different pH's.

The disodium phosphate crystallized from the filtrates of the various examples was surprisingly consistent in the high purity of the product. The various treatments illustrated in the examples were most effective in greatly decreasing the time previously required to separate the solid phase from the filtrate. The differences in the crystals recovered from the filtrate of Examples 3 through 15, using the method of Example 1, were primarily in the Na/P molar ratio. This ratio varied from 2.0 to 2.15, corresponding to the pH to which the reactants were neutralized.

Typical analysis of the sodium phosphate crystals obtained in Examples 3 through 15, after being washed with cold water, were a disodium phosphate content of 35.4 percent, a chloride content of 0.02 percent, a sodium chloride content of 0.033 percent, a Fe content of 8 parts per million, a vanadium content of 4.1 parts per million and trace amounts of manganese and chromium.

While there have been described many embodiments of the present invention, the methods described are not intended to be understood as limiting the scope of the invention as it is realized that changes herein are possible. It is further intended that each element recited in any of the following claims is to be understood as referring to all elements for accomplishing substantially the same results in substantially the same or equivalent manner. It is intended to cover the invention broadly in whatever form its principles may be utilized.

I claim:

1. A process for the production of pure disodium phosphate comprising treating impure wet process phosphoric acid with a reducing agent selected from the group consisting of metallic iron, sodium dithionite and salts of sulfides, nitrites, phosphites and sulfites, at temperatures from about 25 degrees centigrade to about 100 degrees centigrade to convert the metallic impurities in said acid to their lower valence states, then reacting said treated acid with an aqueous impure solution of sodium hydroxide obtained from the catholyte compartment of a chlor-alkali electrolytic cell, at a pH in excess of about 8.0 at temperatures not in excess of about 100 degrees centigrade to produce a liquid phase containing sodium ions, phosphate ions, and soluble impurities and a solid phase, separating the solid phase, the liquid phase and subsequently crystallizing disodium phosphate from the liquid phase.

2. A process for the production of pure disodium phosphate comprising treating impure wet process phosphoric acid with a reducing agent selected from the group consisting of metallic iron, sodium dithionite and salts of sulfides, nitrites, phosphites, and sulfites, at a temperature of from about 25 degrees centigrade to about 100 degrees centigrade to convert the metallic impurities in said acid to their lower valence states, reacting said treated acid with an aqueous impure solution of sodium hydroxide obtained from the catholyte compartment of a chlor-alkali electrolytic cell, at a pH of 8.0 to 9.5 at temperatures not in excess of 100 degrees centigrade to produce a liquid phase containing sodium ions, phosphate ions and soluble impurities and a solid phase, separating the solid phase and liquid phase and subsequently crystallizing disodium phosphate from the liquid phase.

3. A process for the production of pure disodium phosphate comprising treating impure wet process phosphoric acid with a reducing agent selected from the group consisting of metallic iron, sodium dithionite and salts of sulfides, nitrites, phosphites and sulfites, at temperatures of from about 25 degrees centigrade to about 100 degrees centigrade to convert the metallic impurities in said acid to their lower valence states, reacting said treated acid with impure sodium hydroxide-containing electrolytic cell liquor in a mole ratio to provide a solid phase and a liquid phase containing sodium phosphate and soluble impurities, at a pH of 8.0 to 9.5 at temperatures not in excess of about 100 degrees centigrade, adding to the reaction mixture a flocculating agent selected from the group consisting of calcium oxides, calcium hydroxide, lime and milk of lime, in an amount of about 0.05 to 1.0% by weight of the reaction mixture, separating the solid phase from the liquid phase at a temperature of from about 50 to 100 degrees centigrade and cooling the residual solution to a temperature of from about 0 degree centigrade to about 40 degrees centigrade thereby crystallizing disodium phosphate.

4. A process for the production of pure disodium phosphate comprising treating impure wet process phosphoric acid with 0.01 to 0.8% metallic iron based on the weight of the impure acid solution at a temperature of 70 degrees centigrade to 100 degrees centigrade, reacting said treated acid with impure sodium hydroxide-containing electrolytic cell liquor in a mole ratio to produce a solid phase and a liquid phase containing sodium phosphate and soluble impurities at a pH of 8.5 to 9.0, aging the reaction mixture at a temperature of 50 degrees centigrade to 100 degrees centigrade for a period of from about 5 minutes to about 6 hours, separating the solid phase from the mixture at a temperature of about 50 degrees centigrade to 100 degrees centigrade, cooling to residual solution to a temperature of from about 0 degree centigrade to about 40 degrees centigrade, thereby crystallizing disodium phosphate, removing said crystals from the mother liquor, washing said crystals with cold water and thereby recovering pure disodium phosphate.

5. A process for the production of pure disodium phosphate comprising treating impure wet process phosphoric acid with 0.05 to 0.3% metallic iron based on the weight of the impure acid solution at a temperature of from about 70 degrees centigrade to about 100 degrees centigrade, reacting said acid with impure sodium hydroxide-containing electrolytic cell liquor in a Na/P mole ratio of 1.95 to 2.1 to provide a solid phase and a liquid phase containing sodium ions and phosphate ions at a pH of 8.5 to 9.0, adding to the reaction mixture 0.05 to 1.0% calcium oxide by weight of the reaction mixture, aging the reaction mixture at a temperature of from about 50 degrees centigrade to about 100 degrees centigrade for a period of from about 5 minutes to about 6 hours, separating the solid phase from the mixture at a temperature of about 50 degrees centigrade to about 100 degrees centigrade, cooling the residual solution to a temperature of from about 0 degree centigrade to about 40 degrees centigrade to thereby crystallize disodium phosphate, removing said crystals from the mother liquor, washing said crystals with cold water and, thereby, recovering purified disodium phosphate.

6. The process of claim 1 wherein the phosphoric acid and sodium hydroxide are reacted in a Na/P mole ratio of 1.9 to 2.2 to provide a pH in the range of 8.0 to 9.5.

7. The process of claim 1 wherein the reducing agent is metallic iron.

8. The process of claim 1 wherein a flocculating agent selected from the group consisting of calcium hydroxide, calcium oxide, lime and milk of lime, is added to the reaction mixture prior to removing the solid phase.

9. The process of claim 1 wherein the solid phase is removed from the solution at a temperature above about 50 degrees centigrade up to 100 degrees centigrade.

10. The process of claim 2 wherein the flocculating agent is calcium oxide.

11. The process of claim 3 wherein the reduction is effected by adding 0.01 percent to 3.0 percent of a reducing agent by weight of the acid solution to the acid and heating the acid solution to a temperature of 25 degrees centigrade to 100 degrees centigrade.

12. The process of claim 3 wherein the reducing agent is 0.01 percent to 0.8 percent metallic iron based on the weight of the acid solution.

13. The process of claim 3 wherein the reaction mixture is aged after the addition of the flocculating agent, at a temperature of 50 degrees centigrade to 100 degrees centigrade for about 5 minutes to about 6 hours.

14. The process of claim 3 wherein the crystallized sodium phosphate is removed from the mother liquor and washed with cold water thereby recovering a purified sodium phosphate.

References Cited

UNITED STATES PATENTS

| | | | |
|---|---|---|---|
| 1,984,146 | 12/1934 | Lindberg | 23—107 |
| 1,998,182 | 4/1935 | Anable et al. | 23—107 |
| 2,977,191 | 3/1961 | Pottiez | 23—107 |

OTHER REFERENCES

Phosphorus And Its Compounds, vol. II, Technology, Biological Functions, And Applications, Interscience, New York & London, pp. 1214–1215 (1961).

EARL C. THOMAS, *Primary Examiner.*

L. A. MARSH, *Assistant Examiner.*

UNITED STATES PATENT OFFICE
CERTIFICATE OF CORRECTION

Patent No. 3,421,845      Dated January 14, 1969

Inventor(s)   John A. Peterson

It is certified that error appears in the above-identified patent and that said Letters Patent are hereby corrected as shown below:

Column 5, line 38: correct "above 40" to --above about 40--.
Column 5, line 45: change "filtrate" to --filtrate--.
Column 6, line 43: change "reaction" to --reaction--.
Table II, Example 11 in the Filtrate Column, correct "0.1" to --9.1--.
Column 9, line 51: change "herein" to --therein--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents